Dec. 8, 1942.    R. W. LUCE    2,304,310
THREAD LOCKING DEVICE
Filed April 11, 1939

INVENTOR
Richard W. Luce
BY
George T. Gill
ATTORNEY

Patented Dec. 8, 1942

2,304,310

UNITED STATES PATENT OFFICE 2,304,310

THREAD LOCKING DEVICE

Richard W. Luce, Southport, Conn.

Application April 11, 1939, Serial No. 267,238

6 Claims. (Cl. 151—21)

The invention herein disclosed relates to a threaded locking device of the type in which the locking action is effected by a force exerted axially and acting to maintain the surfaces of the thread of the locking device and the thread of a bolt entered therein in frictional engagement.

Various constructions have, heretofore, been proposed to provide a threaded locking device of this general type. Of these, the most satisfactory is that in which there are two axially spaced threaded portions having a thread of the same pitch and a resilient portion between the threaded portions normally holding the threaded portions with the threads thereof out of phase. The resilient portion is so arranged that the resiliency is symmetrically disposed about the axis of the threaded portions to provide a uniform axial resiliency. When a bolt is entered in such a threaded locking device, the resilient portion is expanded axially, within its elastic limit, until the threads of the two portions come into phase with the threads of the bolt. The expanded resilient portion exerts a force axially tending to draw the two threaded portions together and causing the surfaces of the thread of the threaded locking device to engage in frictional contact with the surfaces of the thread of the bolt. The force of friction thus set up is sufficient to resist relative movement of the threaded locking device and the bolt by virtue of forces resulting from vibration.

By the invention herein disclosed, there is provided a threaded locking device of this type the construction of which is especially suitable for manufacturing machined-from-the-bar threaded locking devices or lock-nuts in the smaller sizes, such for example as 8-32 and smaller. The construction also lends itself to the manufacture of lock-nuts and other similar threaded locking devices having a relatively thin wall section of substantially uniform thickness. This is important for the weight of lock-nuts and similar threaded locking devices so constructed is materially less without altering either its efficiency as a lock-nut or its holding power. The weight factor is of substantial moment, for example, where such nuts are used on airplanes as any reduction in the total weight of an airplane increases the load-carrying capacity of the airplane accordingly. Also the mass of the nut is reduced and there is a smaller moment of inertia. In consequence, the forces resulting from vibration and tending to rotate the nut on the bolt are materially lessened. The nut of this invention is likewise much less expensive to manufacture than those now commonly used.

Two forms of lock-nuts have been selected to illustrate the invention. It is, however, to be understood, that the invention is not limited to lock-nuts, as that term is commonly applied, as threaded locking devices of this same general construction may form, for example, an integral part of an assembled mechanism and serve either as a bolt or screw socket or for holding an adjusting screw in adjusted position. A machined-from-the-bar lock-nut and a lock-nut made from sheet metal have been illustrated in the accompanying drawing in which.

Figure 1:
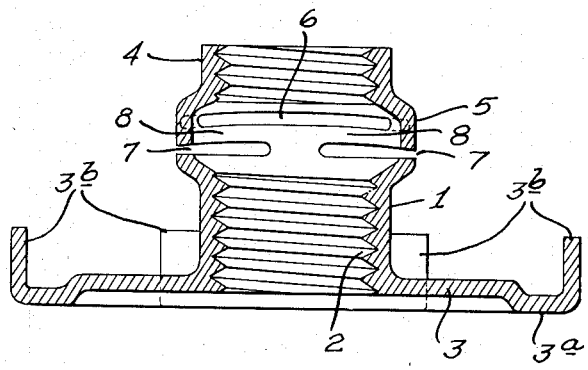
Fig. 1 is a longitudinal section of a stamped nut.

Each of the lock-nuts illustrated in the drawing includes a tapped body portion having the load-carrying threads therein, a smaller tapped portion axially spaced from the body portion and a resilient portion between the two tapped portions. The threads of the two tapped portions are of the same pitch and lead but are axially displaced out of phase. Thus, when a bolt enters the smaller tapped portion the resilient portion expands within the elastic limit of the material, until the threads of the smaller tapped portion come into phase with the threads of the bolt. In each instance, the force exerted by the expanded resilient portion is axial and the surface of the thread of the body portion of the nut is drawn into frictional engagement with the surface of the thread of the bolt. The resilient portion exerts the force that draws these surfaces into frictional contact by virtue of a bending action as distinguished from pure tension or compression.

Figure 2:
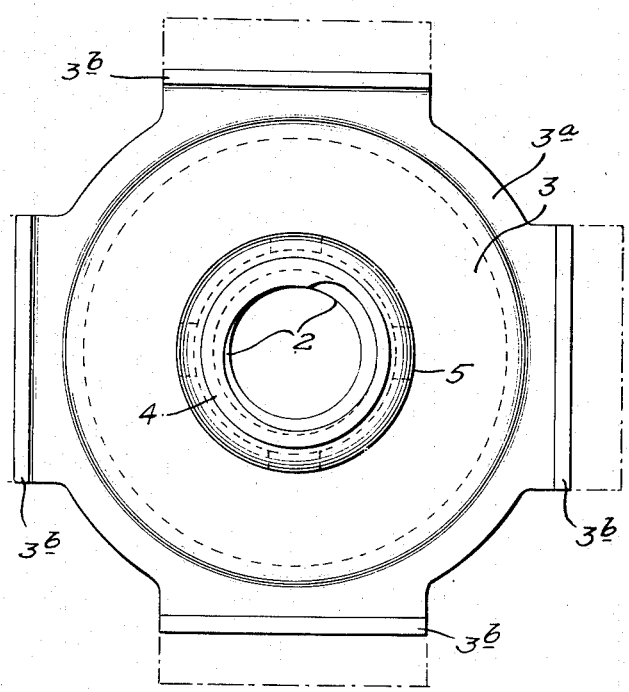
Fig. 2 is a plan of the same.

The lock-nut illustrated in Figs. 1 and 2 is formed from sheet metal and includes a tapped body portion 1 having the load-carrying threads 2 therein. A flange 3 is formed on one end of the body portion and extends substantially at right angles to the axis of the nut. This flange 3 is dish-shaped, as illustrated, having an outer, circumferential annulus 3a axially displaced from the main portion of the flange 3. The annulus forms the engaging surface of the face of the nut. It is shaped as illustrated to provide a certain amount of resiliency, and acts similar to the action of a lock-washer, when the nut is drawn home and provides a means of adjustment compensating for any deviation from right angular relation between the thread axis and the nut seat. This same effect may be obtained by a frustro-conical flange. A number of extensions 3b, illustrated as four in number, are provided at the edge of the flange in the blank when the nut is formed. In the blank these extensions extend radially outwardly from the annulus 3a as indicated in broken lines in Fig. 2. In the finished nut, the extensions 3b extend parallel to the axis of the nut. These extensions form surfaces by which the nut may be engaged by a wrench. Diametrically opposite extensions 3b are spaced apart the same distance as diametrically opposite flats on a hex nut of the same size. It is contemplated that a special spanner wrench, engaging the edges of the four extensions may be used in the initial assembly of the nut on a bolt but the extensions are arranged so that for repair work the nut may be manipulated with an ordinary wrench made for a hex nut.

Axially displaced from the end of the body portion 1 of the nut, opposite to the end from which the flange 3 extends, there is a smaller tapped portion 4. This tapped portion 4 has threads of the same lead as the threads of the body portion 2, the two portions being tapped at the same time. The threads of the two tapped portions are discontinuous and normally out of phase. The portion 4 of the nut is referred to as the smaller tapped portion because in the actual construction of the lock-nuts it is of lesser length than the body portion 1. The threads of this portion are not, in the more common uses to which the threaded locking device is put, load-carrying threads and are provided for the purpose of obtaining the resilient force between the threads of the body portion and the threads of a bolt entered therein, as will be hereinafter described. The portion 4 may be, and for some purposes may preferably be, of the same length as the body portion 1; it is described as the smaller tapped portion as in the lock-nut embodying the invention and illustrated the term is apt, but its significance is solely for the purpose of distinguishing this tapped portion from the tapped body portion.

Joining the two tapped portions there is a resilient portion 5. This resilient portion is cylindrical in shape but of greater diameter than the tapped portions. The inner diameter of this portion is preferably at least slightly greater than the depth of the thread of the tapped portions so that when the blank is tapped, no threads will be cut in the resilient portion 5 and the threads of the two tapped portions will be severed or discontinuous. Two series of overlapping slots 6 and 7 are cut through the wall of the resilient portion. The two series are axially displaced and each series consists of two diametrically opposite slots. These slots are cut by rotating saws or cutters. Two cutters or saws are arranged at the proper elevation to cut the slots 6. The centers of rotations of these cutters are angularly displaced through angles of 180°. Similar cutters are mounted at an elevation to cut the slots 7. Each set of these cutters moves radially inwardly and effects the cut. The cutters for the slots 6 are angularly displaced from the adjacent cutters for the slots 7 through angles of 90° so that the slots 6 and 7 overlap as indicated. The effect of cutting these slots is to form four axially resilient, spring elements 8, the portions of the metal between the overlapping slots. It will be noted that these spring elements are contained in a common radial plane and that they are symmetrically disposed about the thread axis of the nut.

When these slots are cut the blank is tapped. After the blank is tapped, it is compressed beyond the elastic limit of the spring elements 8 to throw the threads of the two tapped portions out of phase. When compressed, the material between the overlapping portions of the slots bends as illustrated in Fig. 1 and takes a set. This resilient portion, thus, normally holds the two tapped portions with the threads thereof out of phase.

When a bolt is entered in the nut, upon reaching the smaller tapped portion, it must expand the resilient portion until the threads of the tapped portion 4 come into phase with the threads of the bolt and in consequence, except for the clearance, into phase with the threads of the body portion 1. This expansion of the resilient portion takes place as a bending action of the spring elements 8 between the overlapping slots. It will be noted that the spring elements are arcuate, circumferential segments. As the resilient portion is expanded these spring elements bend parallel to the axis of the nut. Due to their arcuate configuration, however, no stretching or compression of the spring elements occurs even though the ends thereof are constrained to move in a direction parallel to the axis of the nut. As the spring element of the nut bends in an axial direction the necessary change in length is provided by a change in the radius of curvature of the arcuate spring element, i. e. a radial bending action.

The resiliency of the spring portion of the nut is exerted axially and uniformly about the axis due to the symmetrical disposition of the spring elements and causes the surface of one side of the threads of the body portion of the nut to be drawn into intimate and frictional contact with the surface of one side of the threads of the bolt. This frictional engagement of the surfaces of the threads is sufficient to resist forces resulting from vibration and acting to rotate the nut relative to the bolt. The nut may thus be left on any portion of the bolt and it will be locked in the position in which it is left.

Where the nut is used on a bolt to secure two parts together, as, for example, when the nut is drawn home against a plate, the flange 3 forms the engaging face of the nut and acts as a lock-washer. Thus, if there be any corrosion of the face of a plate against which the nut abuts, the resiliency of the flange will take up the looseness that would otherwise result. It is also to be noted that if the face of the nut be not exactly perpendicular to the axis of the nut, the face of the nut will not ride on or engage on one portion only, as is the case with the ordinary nut, when it is drawn home. The resiliency of the flange permits the flange to adjust itself to any such inaccuracies.

It will be readily apparent to those skilled in the art, that the threaded locking device may take many forms different from the lock-nut described above. For example, the construction described is admirably suitable to form threaded locking devices known as anchor nuts, clinch nuts and gang channel nuts. Likewise, it is especially suitable for formation as an integral part of certain equipment made from sheet metal, such for example, as where a socket for an adjusting screw is desired.

Locking devices of this type made from sheet metal as above described are as efficacious in holding power as similar machined-from-the-bar threaded holding devices. For example, a stamped, sheet metal lock-nut such as that described above, when heat treated, will pull test as well as a machined-from-the-bar nut. The holding power of a nut is of course determined by the strength of the threads in shear and when such nuts as that described above are heat treated, the shear strength of the thread is materially increased. The heat treatment also greatly increases the resiliency of the spring elements making up the resilient portion of the nut.

Figure 3:
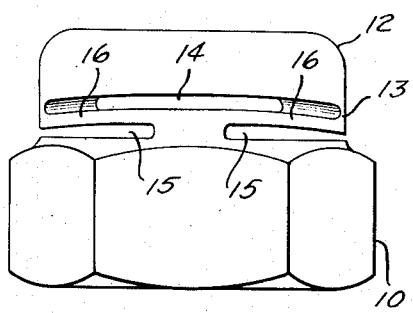
Fig. 3 is an elevation of another form of lock-nut, one made from hexagonal bar stock.
Figure 4:
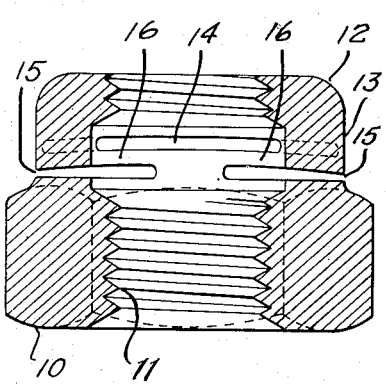
Fig. 4 is a sectional elevation of the same.

The lock-nut illustrated in Figs. 3 and 4 is made from hexagonal bar stock. This nut includes a tapped body portion 10 having the load-carrying threads 11 therein, a smaller tapped portion 12 axially spaced from the body portion, and a resilient portion 13 between the tapped portions. The resilient portion has a larger internal diameter than the tapped portions. This increase in diameter is preferably such that the resilient portion is internally recessed an amount at least slightly greater than the depth of the thread so that the threads of the two tapped portions are discontinuous over the length of the resilient portion. The wall of the resilient portion is slotted as illustrated, there being two pairs 14 and 15 of axially spaced transverse slots. The slots of each pair are diametrically opposite and the pairs of slots are angularly displaced through an angle of ninety degrees. Adjacent slots overlap as indicated. The amount the slots overlap is determined by the axial force it is desired to have exerted by the resilient portion. This force is determined by the amount the slots overlap and the thickness of the resilient portion and the radial wall thickness—i. e. amount of metal in the spring elements formed by cutting the slots.

After the nut blank has been made, the blank is tapped, the tap being run through both tapped portions of the nut. The nut is then compressed axially, the spring elements, indicated by the numeral 16, being bent sufficiently to take a set with the threads of the two tapped portions axially displaced out of phase. When a bolt enters the nut, it must expand the resilient portion, which expansion takes place as a bending action of the spring elements 16. This bending action is well within the elastic limit of the material. The resiliency of the material exerts an axial force which draws the surfaces of the thread of the body portion and the thread of the bolt into intimate frictional contact.

For many purposes for which lock-nuts are used, it is desirable that both the nut and bolt be plated to prevent corrosion. It will be observed that the constructions of the threaded locking devices described herein are such that if plated neither the plating on the threads thereof nor that on the threads of a screw or bolt entered therein will be injured or marred. These threaded locking devices may of course be used over and over again without losing their locking action.

For certain purposes the recessing of the nut may be omitted. If the recessing be omitted the nut and the screw or bolt to be used therewith should preferably be inherently corrosion resisting and the nut is preferably of a softer metal than the surface of the screw. For example where the nut is not recessed at the spring portion, the nut may be bronze and the screw used therewith stainless steel.

From the foregoing descriptions of the several embodiments of the invention illustrated in the drawing, it will be seen that there is provided a lock-nut that is much simpler in construction, less expensive to manufacture and more suitable for varying conditions in use. It will be obvious that various changes may be made, by those skilled in the art, in the details of the embodiments of the invention illustrated in the drawing within the principle and scope of the invention as expressed in the appended claims.

I claim:

1. A threaded locking device of the kind described comprising in combination two axially spaced internally threaded portions, the threads of the two threaded portions being of substantially the same pitch, and an unthreaded resilient portion of an internal diameter greater than the thread diameter normally holding the threaded portion with the threads thereof out of phase toward each other, the resilient portion including a plurality of spring elements symmetrically disposed about the axis of the threaded locking device and arranged to partake of a bending action and to effect an axial resiliency.

2. A threaded locking device of the kind described comprising in combination two axially spaced internally threaded portions, the threads of the two portions being of substantially the same pitch and an unthreaded resilient portion normally holding the threaded portions with the threads thereof out of phase, the resilient portion being radially displaced outwardly of the thread of the threaded portion and including a plurality of spring elements substantially symmetrically displaced about the axis of the device and arranged to partake of a bending action and effect an axial resiliency.

3. A threaded locking device of the kind described comprising in combination two axially spaced internally threaded portions, the threads of the two portions being of substantially the same pitch and an unthreaded resilient portion normally holding the threaded portions with the threads thereof out of phase, the resilient portion being radially displaced outwardly of the thread of the threaded portion and including a plurality of circumferentially spaced, axial resilient strip spring elements arranged in a common diametrical plane and substantially symmetrically disposed about the axis of the threaded locking device and arranged to partake of a bending action and effect an axial resiliency.

4. A threaded locking device of the kind described formed from sheet metal and comprising in combination two axially displaced internally threaded tubular portions of substantially uniform and relatively thin wall section and having threads of substantially the same pitch, and an unthreaded resilient portion normally holding the threaded portions with the threads thereof out of phase and including a plurality of resilient elements radially displaced outwardly of the threaded portions and substantially symmetrically disposed about the axis of the threaded portions.

5. A threaded locking device of the kind described formed from sheet metal and comprising in combination two axially displaced internally threaded tubular portions of substantially uniform and relatively thin wall section and having threads of substantially the same pitch, and an unthreaded resilient portion radially displaced outwardly of the threaded portions and including a plurality of circumferentially spaced, axially resilient strip spring elements arranged in a common diametrical plane and substantially symmetrically disposed about the axis of the threaded locking device and arranged to partake of a bending action.

6. A threaded locking device of the kind described comprising in combination two axially spaced internally threaded portions, the threads of the two portions being of substantially the same pitch and an unthreaded resilient portion normally holding the threaded portions with the threads thereof out of phase, the resilient portion having a greater internal diameter than the thread diameter of the threaded portions and including a plurality of circumferentially spaced, axially resilient strip spring elements arranged in a common diametrical plane and substantially symmetrically disposed about the axis of the threaded locking device and arranged to partake of a bending action and effect an axial resiliency.

RICHARD W. LUCE.